(12) United States Patent
Agudo Araque (10) Patent No.: US 8,847,562 B2
(45) Date of Patent: Sep. 30, 2014

(54) REACTIVE POWER COMPENSATION IN ELECTRICAL POWER SYSTEM

(75) Inventor: Andres Agudo Araque, Madrid (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 152 days.

(21) Appl. No.: 13/384,644

(22) PCT Filed: Jul. 27, 2009

(86) PCT No.: PCT/ES2009/070316
§ 371 (c)(1),
(2), (4) Date: Jan. 18, 2012

(87) PCT Pub. No.: WO2011/012733
PCT Pub. Date: Feb. 3, 2011

(65) Prior Publication Data
US 2012/0112714 A1    May 10, 2012

(51) Int. Cl.
  *G05F 5/00* (2006.01)
  *H02M 1/12* (2006.01)
  *H02J 3/20* (2006.01)
  *H02J 3/18* (2006.01)
  *H02J 3/01* (2006.01)

(52) U.S. Cl.
  CPC ............... *H02J 3/1842* (2013.01); *Y02E 40/22* (2013.01); *H02J 3/20* (2013.01); *Y02E 40/16* (2013.01); *H02J 3/01* (2013.01)
  USPC ............................................ 323/210; 363/40

(58) Field of Classification Search
  USPC .................. 323/205–210; 363/34–41
  See application file for complete search history.

(56) References Cited

U.S. PATENT DOCUMENTS

| | | | | |
|---|---|---|---|---|
| 4,812,669 | A | * | 3/1989 | Takeda et al. ................. 307/105 |
| 5,548,203 | A | * | 8/1996 | Kemerer et al. .............. 323/210 |
| 5,631,545 | A | * | 5/1997 | Norman et al. ............... 323/205 |
| 5,751,138 | A | * | 5/1998 | Venkata et al. ............... 323/207 |
| 5,757,099 | A | * | 5/1998 | Cheng et al. .................. 307/105 |
| 7,078,831 | B2 | * | 7/2006 | Ferraro et al. ................ 307/105 |
| 7,099,165 | B1 | * | 8/2006 | Rozman ......................... 363/39 |
| 2007/0250217 | A1 | * | 10/2007 | Yoon et al. .................... 700/286 |
| 2008/0252143 | A1 | * | 10/2008 | Llorente Gonzalez et al. . 307/47 |
| 2009/0251111 | A1 | * | 10/2009 | Choy et al. ...................... 322/20 |

FOREIGN PATENT DOCUMENTS

CN    201163721 Y    12/2008

OTHER PUBLICATIONS

Translation of received reference in the IDS (CN 201163721 Y).*

* cited by examiner

*Primary Examiner* — Timothy J Dole
*Assistant Examiner* — Yusef Ahmed
(74) *Attorney, Agent, or Firm* — Ladas & Parry LLP (57) ABSTRACT

A reactive power compensation system for compensating reactive power requirements in an electrical power system. The reactive power compensation system includes a static synchronous compensation unit, a current harmonics elimination unit, and a compensation control unit. The static synchronous compensation unit includes a plurality of static synchronous compensation modules for compensating reactive power in the electrical power system. The current harmonics elimination unit includes a plurality of active filter modules for eliminating current harmonics generated in the electrical power system. The compensation control unit implements a sequential control mechanism for regulating the operation of the static synchronous compensation modules and the active filter modules.

11 Claims, 8 Drawing Sheets

REACTIVE POWER COMPENSATION IN ELECTRICAL POWER SYSTEM

RELATED APPLICATION INFORMATION

This application is a 371 of International Application PCT/ES2009/070316 filed 27 Jul. 2009 and entitled "REACTIVE POWER COMPENSATION IN ELECTRICAL POWER SYSTEM", which was published on 3 Feb. 2011, with International Publication Number WO 2011/012733 A1.

FIELD OF THE PRESENT INVENTION

The present invention relates, in general, to the field of electrical power systems, and specifically, to a system for reactive power compensation in an electrical power system. More specifically, the present invention relates to a system for reactive power compensation in an electrical power system including a wind power generation unit.

BACKGROUND OF THE PRESENT INVENTION

With the energy crisis engulfing the world, alternative methods of energy generation are becoming increasingly important. Wind energy has emerged as a promising renewable energy source. The use of wind farms to generate energy is becoming increasingly popular in developed as well as developing economies. With improvements in material, design, and manufacturing technologies, the volume of commercial wind energy production has been steadily increasing. As a consequence, wind energy has become a viable and economic renewable energy source. However, as a consequence of uncertainty of output in wind energy based power generation units, the integration with power transmission grids becomes a challenging task. One of the main problems associated with wind farms is the variation of power supply due to the intermittent nature of the blowing winds. The non-uniform production of power leads to problems in power system voltage and frequency stability. Thus, an important challenge is to implement such solutions that facilitate integration of distributed wind energy based electrical power generation units with power transmission grids while maintaining power quality as well as power system stability.

An important aspect of improving power quality in an electrical power system is reactive power compensation. Electric power includes real power and reactive power. Reactive power is also known as watt-less power as it does not transfer any net energy to the load. The ratio of the real power to the reactive power is defined as the power factor of an electrical power system. Thus, an important challenge in electric power transmission is to control the reactive power and keep the power factor as close to unity as possible. Effective power factor regulation ensures that a near constant voltage is available over a wide range of load conditions. The energy losses in long distance power transmission lines due to power transmission line ground impedances increase the need for reactive power compensation. In general, effective reactive power compensation increases the power transfer capability of the electrical power system.

One of conventional techniques of reactive power compensation is Static VAR Compensation (SVC). However, this technique suffers from drawbacks of fluctuating current characteristics under low voltage situations.

In recent years, Flexible Alternating Current Transmission System (FACTS) has emerged as a new class of solutions for regulating power transmission parameters in electrical power systems. FACTS is a system comprising power electronics based components and other static equipment that facilitate control of one or more system parameters in an AC electrical power system.

Static Compensator (STATCOM), a member of the FACTS family of solutions, is used for reactive power compensation in AC transmission networks. STATCOM can act as a source or as a sink of reactive AC power in electrical power system. Accordingly, STATCOM is used to regulate power factor in electrical power system. Numerous control approached have been proposed in the past. However, these control approaches fail to satisfactorily implement an effective reactive power compensation and harmonics elimination solution. Moreover, currently known STATCOM implementations suffer from drawbacks arising due to a monolithic design.

Another important aspect of reactive power compensation is control of current harmonics generated in the electrical power system. The power generation unit should ideally experience a sinusoidal load with minimum harmonics distortion. However, under certain conditions, significant magnitude of low-order harmonic currents is generated in the electrical power system and accordingly, the power generation unit experiences a non-sinusoidal load, which affects the stability of the electrical power system. In the electrical power system, various parameters can lead to the generation of current harmonics. The important factors leading to generation of current harmonics include non-linear loads (such as arc furnaces and static power converters), operating conditions, and grid impedances in the electrical power system. The presence of current harmonics affects power quality and power system stability. Conventionally, passive filters (LC filters) are used to eliminate the current harmonics generated in the electrical power system. The passive filters are designed to cancel specific harmonics generated at the load end. However, if the current harmonics spectrum changes, the passive filters are not able to effectively attenuate the current harmonics. In current state of the art, a few FACTS based current harmonics elimination systems have been proposed. However, operation of sensitive power electronics based devices used in a wind farm are adversely affected by the FACTS system operating close to the wind farm. This may potentially lead to high current distortions, which leads to windmill trips and production losses. Accordingly, use of FACTS based current harmonics elimination systems near wind farms is a challenging task.

In view of the above problems associated with reactive power compensation in electrical power systems, there is a need for a system that can effectively manage the reactive power compensation requirements and eliminate the current harmonics generated in the electrical power system.

SUMMARY

An objective of the present invention is to achieve effective reactive power compensation in an electrical power system.

Another objective of the present invention is to effectively eliminate current harmonics in the electrical power system.

Still another objective of the present invention is to implement an improved control strategy of the reactive power compensation system eliminate current harmonics in the electrical power system.

Another objective of the present invention is to achieve fault tolerance and redundancy in the reactive power compensation system.

In accordance with an embodiment of the present invention, a reactive power compensation system is provided. The reactive power compensation system comprises static synchronous compensation (STATCOM) unit, current harmonics elimination unit, and a compensation control unit. The static synchronous compensation unit includes a plurality of static synchronous compensation modules for compensating reactive power in the electrical power system. The current harmonics elimination unit includes a plurality of active filter modules for eliminating current harmonics generated in the electrical power system. The compensation control unit implements a sequential control mechanism for regulating the operation of the static synchronous compensation unit and the current harmonics elimination unit.

Various embodiments of the present invention offer several advantages. The present invention implements a modular design of the reactive power compensation system. The reactive power compensation system is operated in accordance with a sequential control mechanism. The present invention not only effectively manages the reactive power compensation requirements in the electrical power system but also effectively eliminates the current harmonics up to $19^{th}$ order harmonics under varying load conditions. Further, as a consequence of the modular design, the present invention provides improved fault tolerance and redundancy in the reactive power compensation system.

BRIEF DESCRIPTION OF FIGURES

The accompanying figures, where like reference numerals refer to identical or functionally similar elements throughout the separate views, and which, together with the detailed description below, are incorporated in and form part of the specification, serve to further depict various embodiments and explain various principles and advantages, all in accordance with the present invention.

It will be appreciated that elements in the figures are depicted for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the system for reactive power compensation in an electrical power system, in accordance with various embodiments of the present invention, it should be observed that the present invention resides primarily in combinations of system elements related to reactive power compensation in an electrical power system. Accordingly, the apparatus components have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by "comprises . . . a" does not, without more constraints, preclude the existence of additional identical elements in the process, method, article or apparatus that comprises the element. The term "another," as used in this document, is defined as at least a second or more. The terms "includes" and/or "having," as used herein, are defined as comprising.

A reactive power compensation system for managing reactive power compensation requirements in an electrical power system is provided. The reactive power compensation system includes a static synchronous compensation (STATCOM) unit, a current harmonics elimination unit, and a compensation control unit. The static synchronous compensation unit includes a plurality of static synchronous compensation modules for compensating reactive power in the electrical power system. The current harmonics elimination unit includes a plurality of active filter modules for eliminating current harmonics generated in the electrical power system. The compensation control unit implements a sequential control mechanism for regulating the operation of the static synchronous compensation unit and the current harmonics elimination unit.

Figure 1:
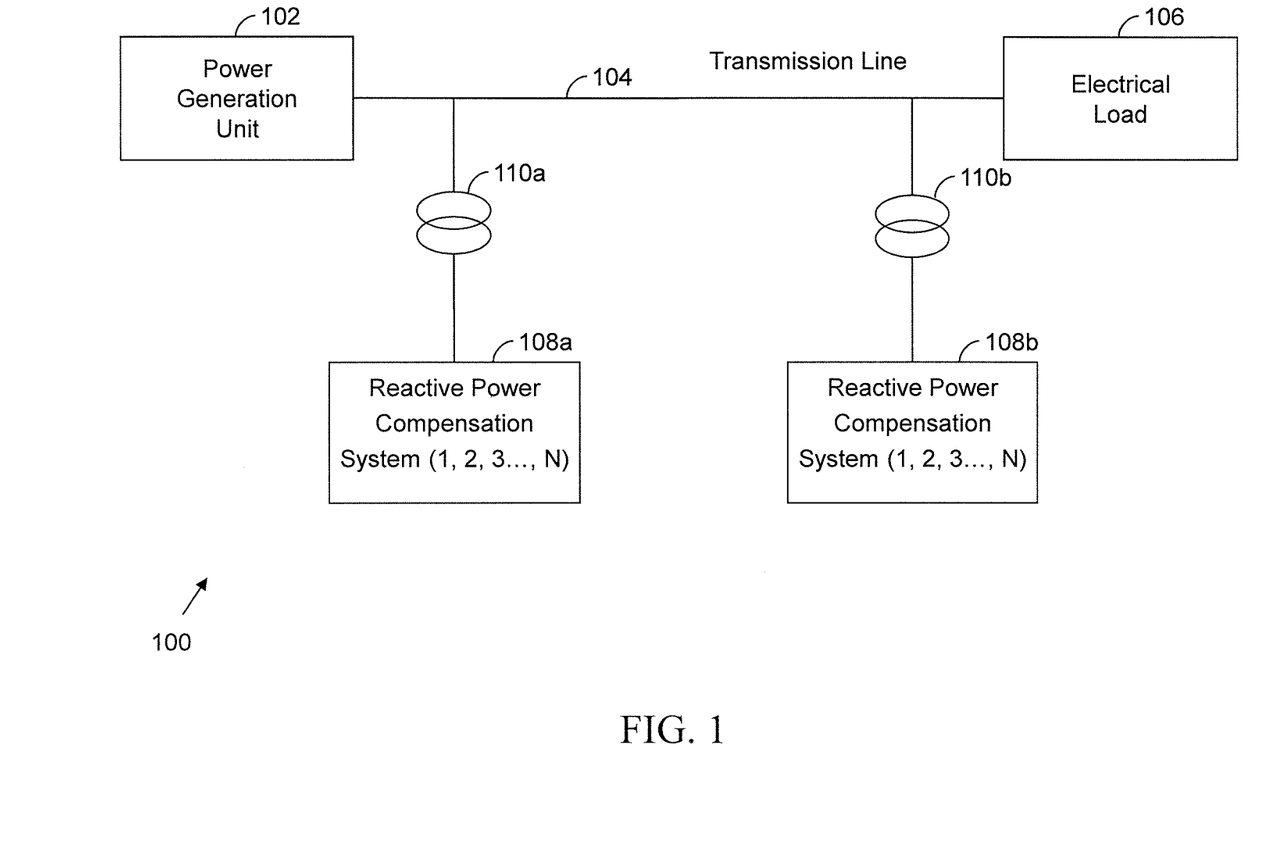
FIG. 1 is a schematic diagram depicting an electrical power system 100, in which various embodiments of the present invention may be implemented.

FIG. 1 is a schematic diagram depicting an electrical power system 100, in which various embodiments of the present invention may be implemented. The electrical power system 100 includes a power generation unit 102, a power transmission line 104, electrical load 106, one or more reactive power compensation systems 108a and 108b (hereinafter individually referred to as reactive power compensation system 108 and collectively referred to as reactive power compensation systems 108), and a plurality of coupling transformers 110a and 110b (hereinafter individually referred to as coupling transformer 110 and collectively referred to as coupling transformers 110).

The power generation unit 102 may be any commonly known power generation utility such as hydro or a thermal power plant. In one embodiment of the present invention, the power generation unit 102 may be based on a renewable energy source of energy; more specifically, the power generation unit 102 may be a wind farm generating power based on wind energy.

Electrical power from the power generation unit 102 is transmitted to the electrical load 106 through the power transmission line 104. Examples of the electrical load 106 include household consumers, industries and so on.

The power transmission line 104 has inherent inductive impedance which leads to reactive power losses during the transmission of power. Further, most examples of the electrical load 106 are also inductive, and thus, require reactive power for their operation. The reactive power compensation systems 108 locally supplies the reactive power required by the power transmission line 104 and the electrical load 106. Thus, the reactive power is not drawn from the power generation unit 102 and thereby, the losses in the electrical power system 100 are reduced.

The one or more reactive power compensation systems 108 may be connected across the power transmission lines. As shown in FIG. 1 the one or more reactive power compensation systems 108 are connected to the power transmission line 104 through the coupling transformers 110. The reactive power compensation systems 108 may be connected and disconnected from the power transmission line 104 by controlling the operation of the coupling transformers 110. The operation of the coupling transformers 110 is controlled by a Supervisory Control and Data Acquisition (SCADA) system (not shown in FIG. 1).

In case of long-distance power transmission lines, a number of reactive power compensation systems 108 may be connected to the power transmission line 104 at predefined intervals. Due to effective reactive power compensation, the reactive power compensation system 108 facilitates voltage regulation across the power transmission line 104.

Figure 2:
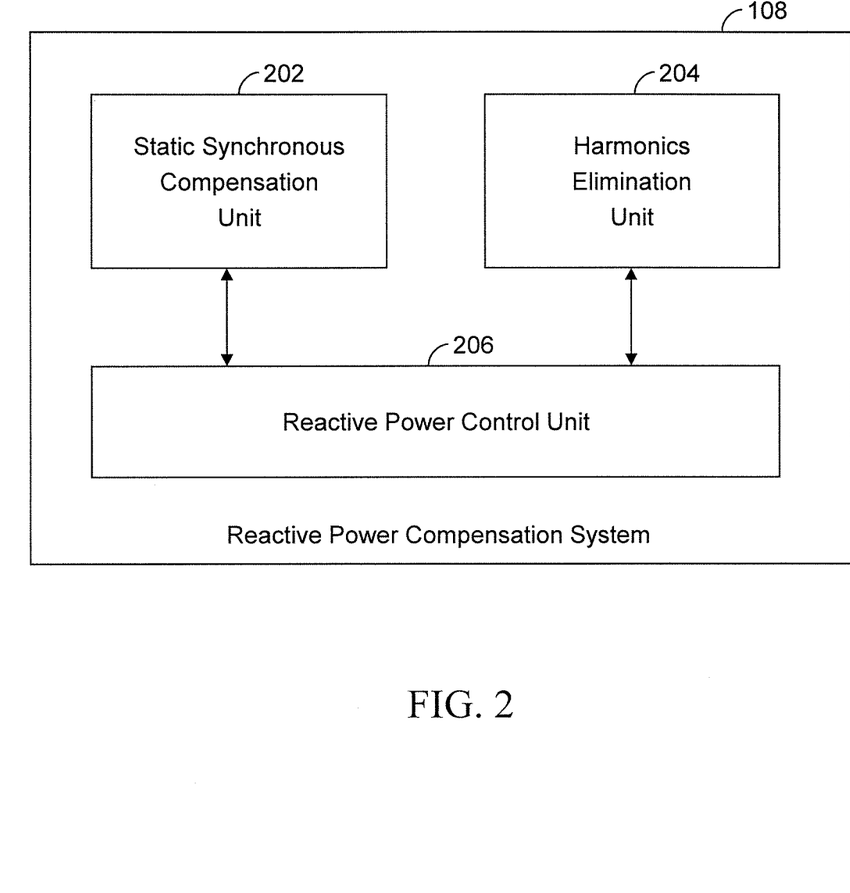
FIG. 2 is a block diagram depicting a reactive power compensation system 108, in accordance with an embodiment of the present invention.

FIG. 2 is a block diagram depicting the reactive power compensation system 108, in accordance with an embodiment of the present invention. The reactive power compensation system 108 includes a static synchronous compensation (STATCOM) unit 202, a current harmonics elimination unit 204, and a compensation control unit 206. The static synchronous compensation unit 202 includes a plurality of static synchronous compensation modules for compensating reactive power in the electrical power system (explained in conjunction with FIGS. 3 and 4). The current harmonics elimination unit 204 includes a plurality of active filter modules for eliminating current harmonics generated in the electrical power system (explained in FIGS. 5 and 6). The compensation control unit 206 implements a sequential control mechanism for regulating the operation of the static synchronous compensation unit 202 and the harmonics elimination unit 204.

The compensation control unit 206 is based on Integrated Gate Bipolar Transistor (IGBT) technology and employs a microcontroller board with specific I/O ports to control the operation of various static synchronous compensation unit 202 and current harmonics elimination unit 204 included in the reactive power compensation unit 108. The compensation control unit 206 interfaces with a Supervisory Control and Data Acquisition (SCADA) system (not shown in FIG. 2), which monitors various operational parameters in the electrical power system 100.

Figure 3:
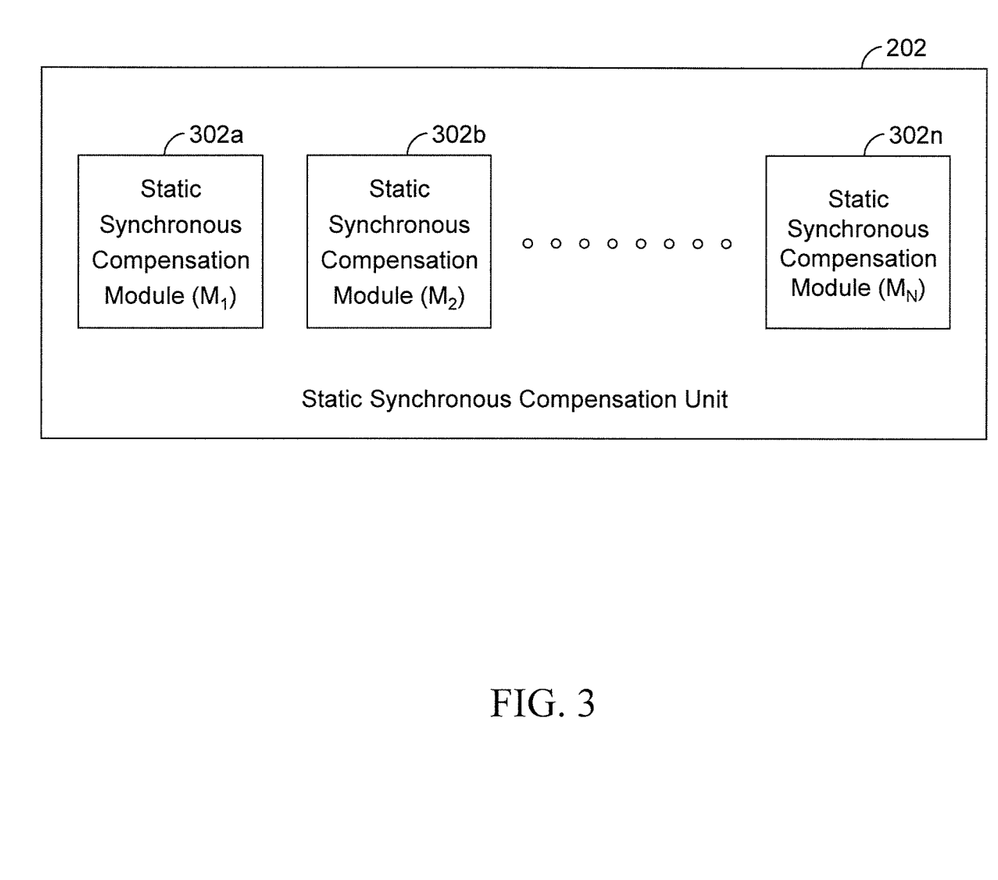
FIG. 3 is a block diagram depicting a static synchronous compensation unit 202, in accordance with an embodiment of the present invention.

FIG. 3 is a block diagram depicting a static synchronous compensation unit 202, in accordance with an embodiment of the present invention. The static synchronous compensation unit 202 includes a plurality of static synchronous compensation modules 302a, 302b . . . , and 302n (hereinafter individually referred to as static synchronous compensation module 302 and collectively referred to as static synchronous compensation modules 302). Each static synchronous compensation module 302 is connected to the power transmission line 104 through the coupling transformer 110.

As shown in FIG. 3, the static synchronous compensation unit 202 has a modular design. One or more static synchronous compensation modules 302 may be activated based on present requirements in the electrical power system 100. The operation of each static synchronous compensation module 302 is governed by the compensation control unit 206. The compensation control unit 206 receives information related to the present load conditions and power factor across the power transmission line 104 from the SCADA system. The compensation control unit 206 activates one or more static synchronous compensation modules 302 based on the information received from the SCADA system. The compensation control unit 206 activates the static synchronous compensation modules 302 in a predefined sequence based on the varying load conditions.

The modular design of the static synchronous compensation unit 202 provides fault tolerance and redundancy in the reactive power compensation system 108. Thus, the reactive power compensation system 108 exhibits an improved fault ride-through behavior by ensuring at least partial compensation of reactive power in case of failure of one or more static synchronous compensation modules 302.

Figure 4:
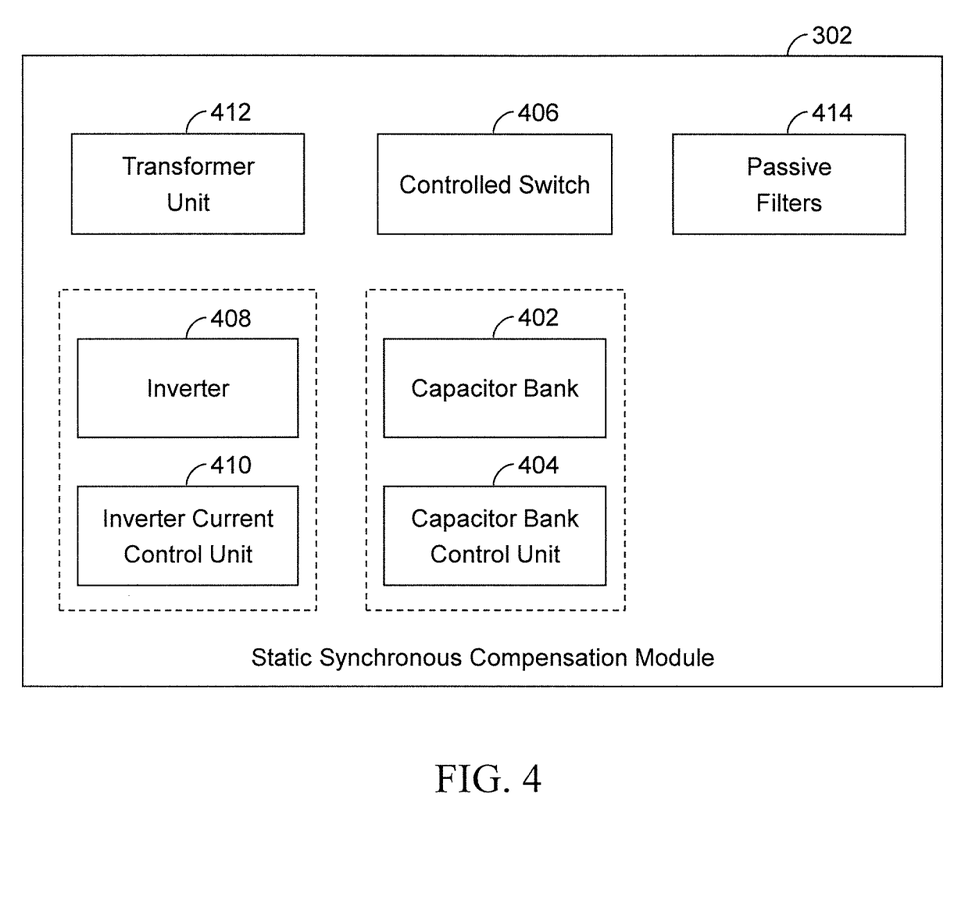
FIG. 4 is a block diagram depicting a static synchronous compensation module 302, in accordance with an embodiment of the present invention.

FIG. 4 is a block diagram depicting the static synchronous compensation module 302, in accordance with an embodiment of the present invention. The static synchronous compensation module 302 includes a capacitor bank 402, a capacitor bank control unit 404, a controlled switch 406, an inverter 408, an inverter current control unit 410, a transformer unit 412, and one or more passive filters 414.

For example, the compensation control unit 206 may activate the static synchronous compensation module 302 through triggering the capacitor bank control unit 404. The capacitor bank control unit 404, in turn, closes the controlled switch 406. When connected to the power transmission line 104, the capacitor bank 402 generates reactive power to be transmitted to the power transmission line 104.

The inverter 408 converts the DC voltage at the capacitor bank 402 in to a voltage of desired level in accordance with the control signal received from compensation control unit 206. Thus, the inverter 408 acts as a voltage source of adjustable magnitude and phase. The inverter current control unit 410 dynamically adjusts the phase angle between the inverter voltage and the power transmission line voltage such that the static synchronous compensation module 302 generates (or absorbs) the desired level of reactive power at the point of connection to the power transmission line 104. The transformer unit 412 is a step-down transformer to step-down the voltage in accordance with the operational voltage of the reactive power compensation system 108.

In accordance with an embodiment of the present invention, the output voltage of the inverter 408 is $V_i$. The voltage of the electrical power system 100 at the point of connection of the static synchronous compensation module 302 is $V_s$. The output current of the static synchronous compensation module 302 is I which varies in accordance with $V_i$. The static synchronous compensation module 302 can operate in three modes. When $V_i = V_s$, the reactive power transfer is zero and the static synchronous compensation module 302 neither generates nor absorbs reactive power. When $V_i$ is less than $V_s$, the static synchronous compensation module 302 acts as an inductive reactance connected to the power transmission line 104. In this mode, the current I flows from the power transmission line 104 to the static synchronous compensation module 302, which thus, absorbs reactive power. In the third mode, if $V_i$ is greater than $V_s$, the static synchronous compensation module 302 acts as a capacitive reactance connected to the power transmission line 104. In this mode, the current I flows from the static synchronous compensation module 302 to the power transmission line 104, which thus, generates reactive power. Passive filters 414 reduce the current harmonics at the output of the static synchronous compensation module 302.

Figure 5:
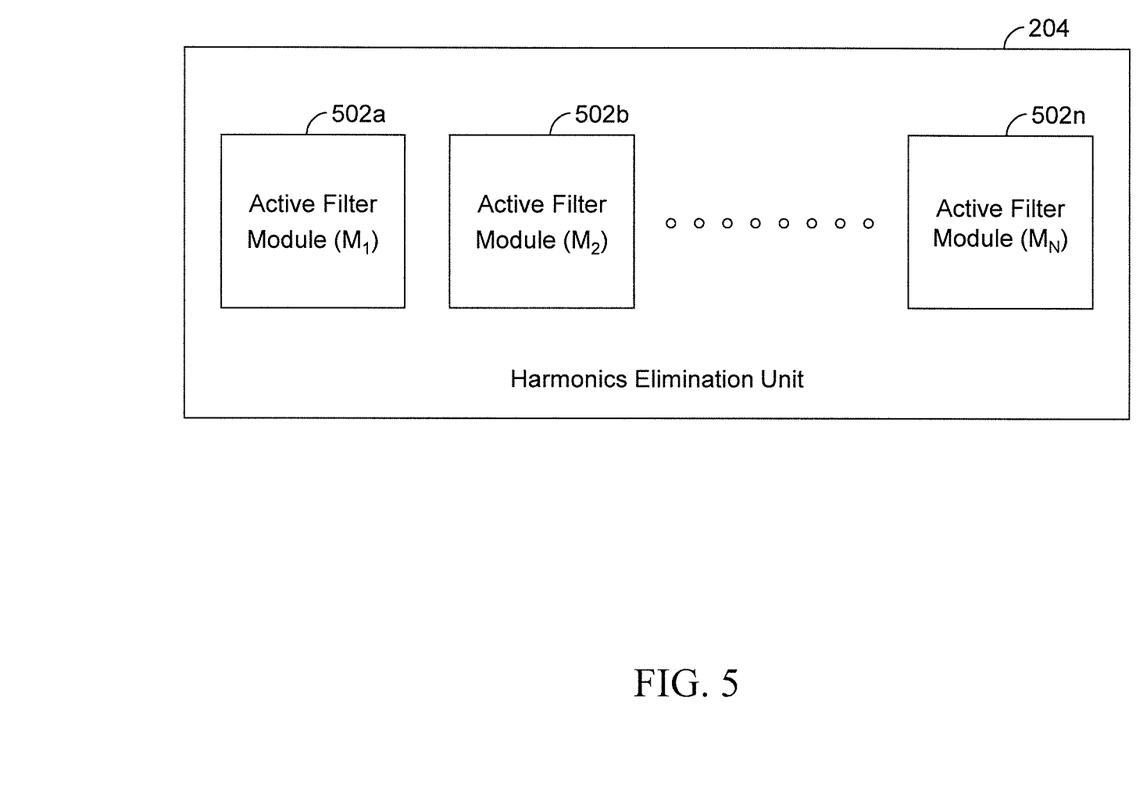
FIG. 5 is a block diagram depicting a current harmonics elimination unit 204, in accordance with an embodiment of the present invention.

FIG. 5 is a block diagram depicting the current harmonics elimination unit 204, in accordance with an embodiment of the present invention. The current harmonics elimination unit 204 includes a plurality of active filter modules 502a, 502b . . . , and 502n (hereinafter individually referred to as active filter module 502 and collectively referred to as active filter modules 502). Each active filter module 502 is connected to the power transmission line 104 through coupling transformer 110.

Similar to the static synchronous compensation unit 202, the current harmonics elimination unit 204 has a modular design. One or more active filter modules 502 may be activated based on present requirements in the electrical power system 100. The operation of each active filter module 502 is governed by the compensation control unit 206. The compensation control unit 206 receives information related to the current harmonics across the power transmission line 104 from the SCADA system. The compensation control unit 206 activates one or more active filter modules 502 based on the information received from the SCADA system. The compensation control unit 206 activates the active filter modules 502 in a predefined sequence based on the varying load conditions. As a consequence, the current distortion level is maintained approximately constant for load conditions varying within a predefined range of operating conditions.

The modular design of current harmonics elimination unit 204 provides fault tolerance and redundancy in the reactive power compensation system 108. Thus, the reactive power compensation system 108 exhibits an improved fault ride-through behavior by ensuring at least partial elimination of current harmonics in case of failure of one or more active filter modules 502.

Figure 6:
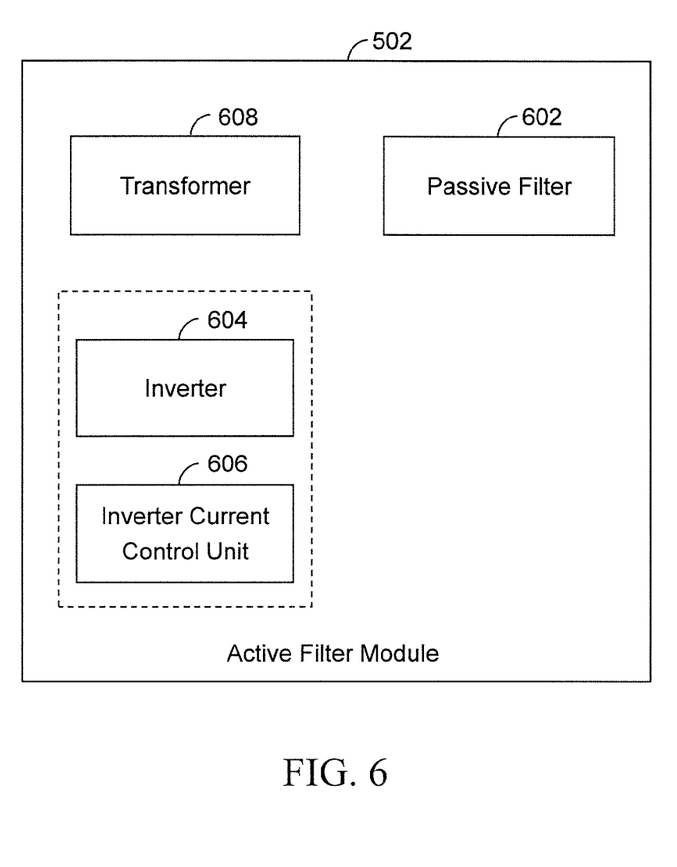
FIG. 6 is a block diagram depicting an active filter module 502, in accordance with an embodiment of the present invention.

FIG. 6 is a block diagram depicting an active filter module 502, in accordance with an embodiment of the present invention. The active filter module 502 includes one or more passive filters 602, an inverter 604, an inverter current control unit 606, and a transformer unit 608.

The passive filter 602, in conjunction with other components of the active filter module 502, is capable of generating current harmonics opposite to the current harmonics generated in the electrical power system 100. The operation of the inverter 604, the inverter current control unit 606, and the transformer unit 608 are similar to the inverter 408, the inverter current control unit 410, and the transformer unit 412 respectively. The active filter module 502, as described herein, is capable of eliminating harmonics up to $19^{th}$ order from the electrical power system 100. The compensation control unit 206 controls the coupling transformers 110 to connect the active filter module to the power transmission line 104.

Figure 7:
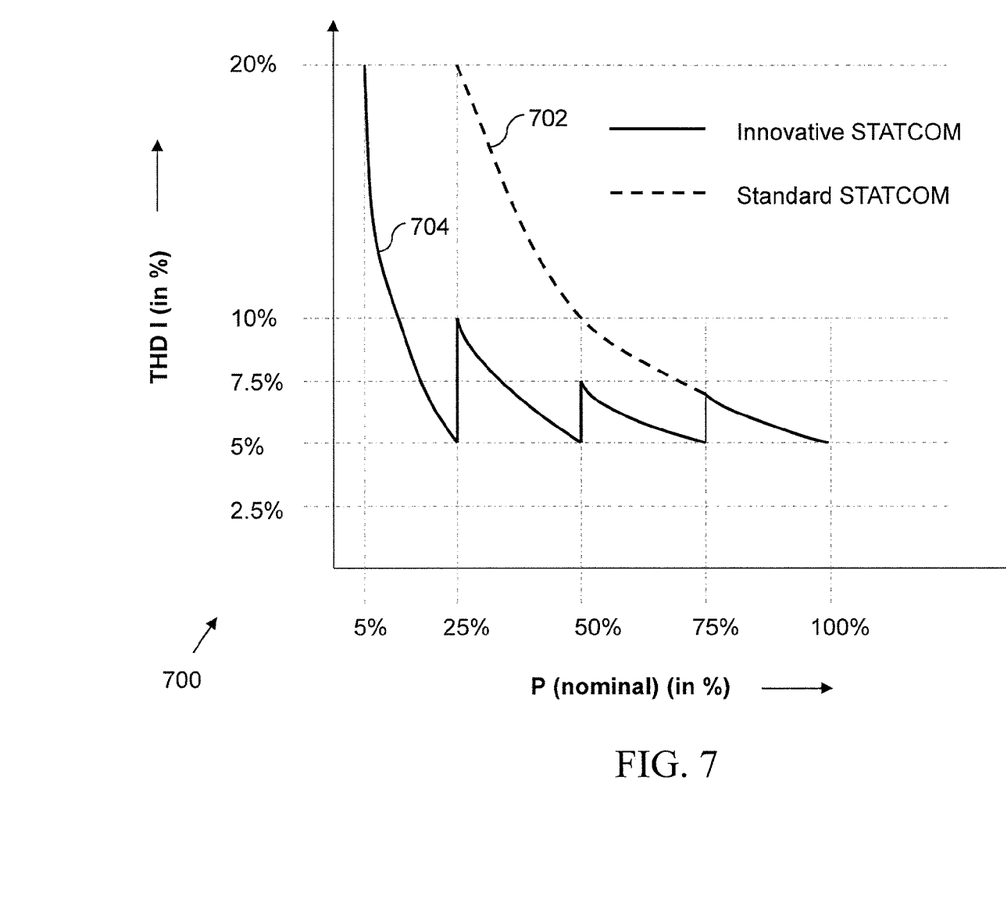
FIG. 7 is a graph depicting the total harmonics distortion relative to the total currents in the electrical power system 100, in accordance with an embodiment of the present invention.

FIG. 7 is a graph depicting the total harmonics distortion relative to the total currents in the electrical power system 100. The graph shows a total harmonic distortion curve 702 in accordance with the current state of the art and a total harmonic distortion curve 704 in accordance with the present invention.

The percentage of harmonic currents in the electrical power system 100 is constrained to low levels for a wide range of load conditions. The current distortion level is approximately constant for load conditions varying within a predefined operating range. The current distortion level achieved at the nth factor of nominal power supply is the same as the current distortion level achieved at the nominal power, 'n' represents the number of active filter modules 502 activated in the current harmonics elimination unit 204.

As shown in FIG. 7, the current distortion level for load conditions varying between nominal power and three-fourths of the nominal power is confined to less than 7.5%. Similarly, for load conditions varying between nominal power and one-half of the nominal power, the current distortion level is confined to less than 7.5%. Moreover, for load conditions varying between nominal power and one-fourth of the nominal power, the current distortion level is under 10%.

Figure 8:
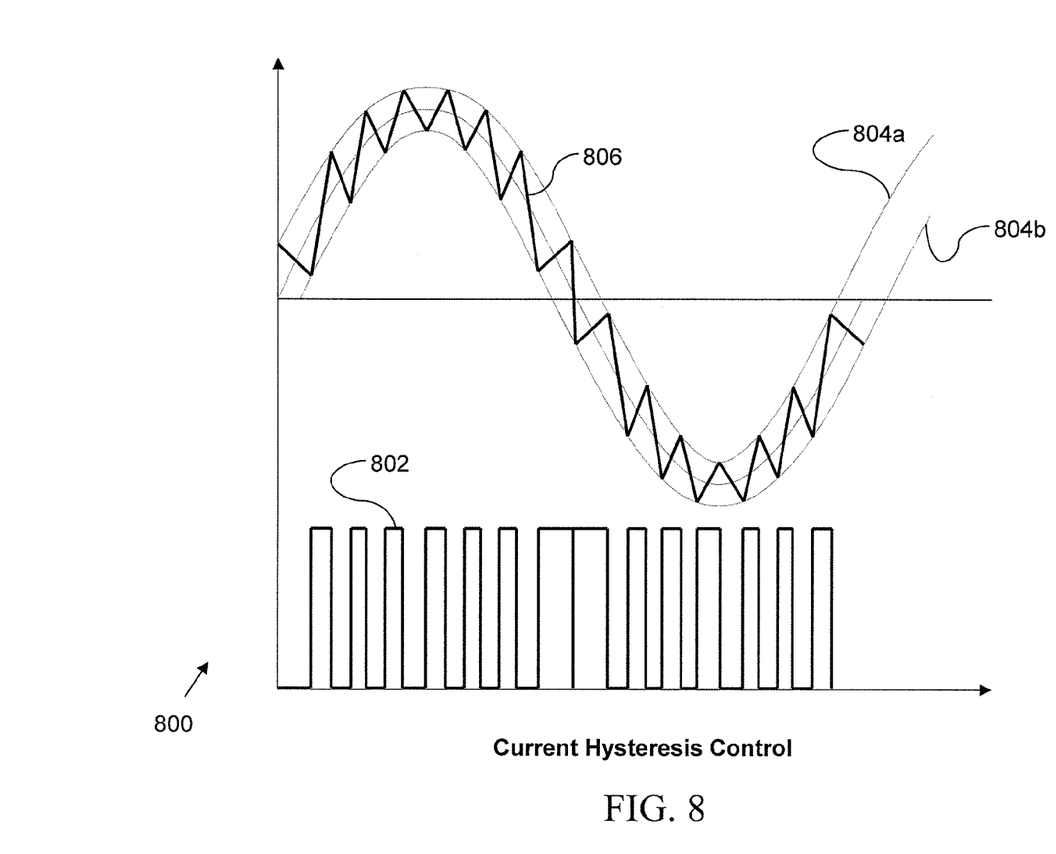
FIG. 8 is a graph depicting current hysteresis control by reactive power compensation system 108, in accordance with an embodiment of the present invention.

FIG. 8 is a graph depicting current hysteresis control by the reactive power compensation system 108, in accordance with an embodiment of the present invention. The graph shows IGBT control signal 802, a resultant current 806, a hysteresis band upper limit 804a and a hysteresis band lower limit 804b.

The reactive power compensation unit 108 implements a hysteresis band delimited by the hysteresis band upper limit 804a and the hysteresis band lower limit 804b. The hysteresis band control ensures that the resultant current 806 is nearly sinusoidal.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A reactive power compensation system for reactive power compensation in a power transmission network, the power transmission network comprising a wind power generation unit, the reactive power compensation system comprising:
   a static synchronous compensation unit comprising a plurality of static synchronous compensation modules for compensating reactive power in the power transmission network;
   a harmonics elimination unit comprising a plurality of active filter modules for eliminating current harmonics generated in the power transmission network; and
   a compensation control unit for controlling the operation of the static synchronous compensation unit and the harmonics elimination unit,
   wherein the compensation control unit is configured to facilitate a sequential control of the plurality of static synchronous compensation modules and the plurality of active filter modules in a predefined sequence based on a load condition in the power transmission network, and
   wherein each active filter module comprises a plurality of passive filters, an inverter, an inverter current control unit, and a transformer unit.

2. The reactive power compensation system of claim 1, wherein each static synchronous compensation module comprises a capacitor bank, a capacitor bank control unit, and a controlled switch.

3. The reactive power compensation system of claim 2, wherein each static synchronous compensation module further comprises an inverter, an inverter current control unit, and a transformer unit.

4. The reactive power compensation system of claim 1, wherein the compensation control unit comprises a microcontroller.

5. The reactive power compensation system of claim 1, wherein the a compensation control unit is configured to interface with a SCADA system to retrieve information related to magnitude of reactive power compensation for power transmission network.

6. The reactive power compensation system of claim 1, wherein the static synchronous compensation unit implements a hysteresis band control for generating a sinusoidal current in the power transmission network.

7. The reactive power compensation system of claim 1, wherein a current distortion level at load points below full-load reaches the same current distortion level achieved at full-load.

8. The reactive power compensation system of claim 1, wherein the current distortion level at nth factor of nominal power supply is same as the current distortion level at nominal power, wherein n is the number of static synchronous compensation modules in the static synchronous compensation unit.

9. The reactive power compensation system of claim 1, wherein the harmonics elimination unit removes current harmonics up to $19^{th}$ order.

10. A reactive power compensation system for reactive power compensation in a power transmission network, the power transmission network comprising a wind power generation unit, the reactive power compensation system comprising:
- a static synchronous compensation unit comprising a plurality of static synchronous compensation modules for compensating reactive power in the power transmission network;
- a harmonics elimination unit comprising a plurality of active filter modules for eliminating current harmonics generated in the power transmission network; and
- a compensation control unit for controlling the operation of the static synchronous compensation unit and the harmonics elimination unit,
- wherein the compensation control unit is configured to facilitate a sequential control of the plurality of static synchronous compensation modules and the plurality of active filter modules in a predefined sequence based on a load condition in the power transmission network, and
- wherein the compensation control unit is configured to interface with a SCADA system to retrieve information related to magnitude of reactive power compensation for power transmission network.

11. A reactive power compensation system for reactive power compensation in a power transmission network, the power transmission network comprising a wind power generation unit, the reactive power compensation system comprising:
- a static synchronous compensation unit comprising a plurality of static synchronous compensation modules for compensating reactive power in the power transmission network;
- a harmonics elimination unit comprising a plurality of active filter modules for eliminating current harmonics generated in the power transmission network; and
- a compensation control unit for controlling the operation of the static synchronous compensation unit and the harmonics elimination unit,
- wherein the compensation control unit is configured to facilitate a sequential control of the plurality of static synchronous compensation modules and the plurality of active filter modules in a predefined sequence based on a load condition in the power transmission network, and
- wherein the static synchronous compensation unit implements a hysteresis band control for generating a sinusoidal current in the power transmission network.

* * * * *